UNITED STATES PATENT OFFICE.

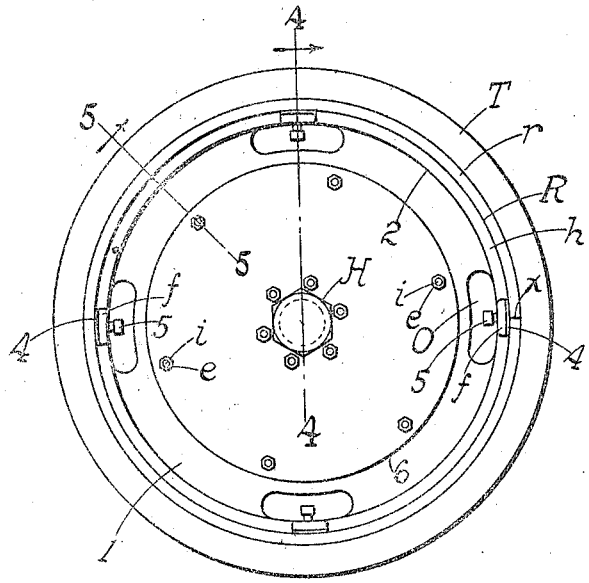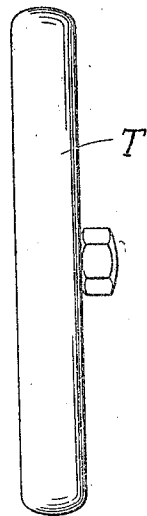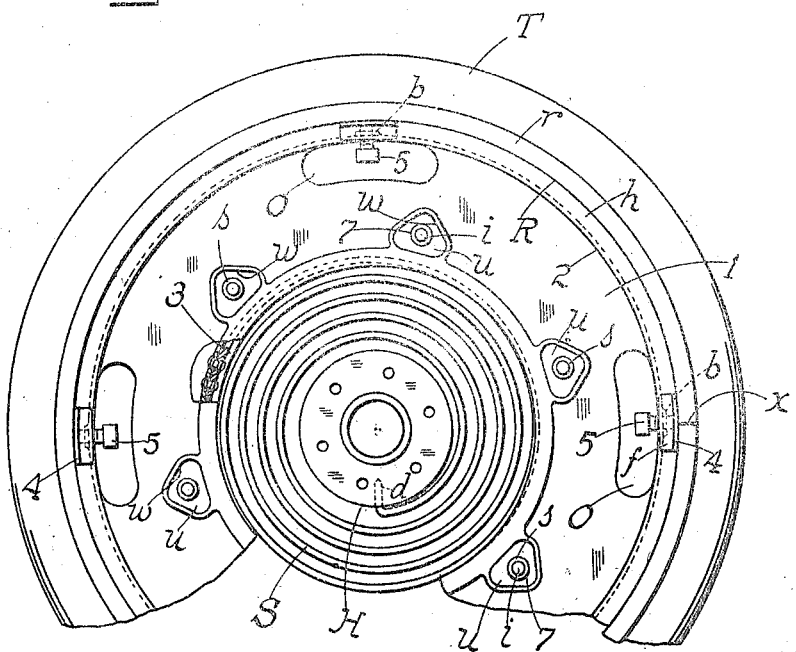

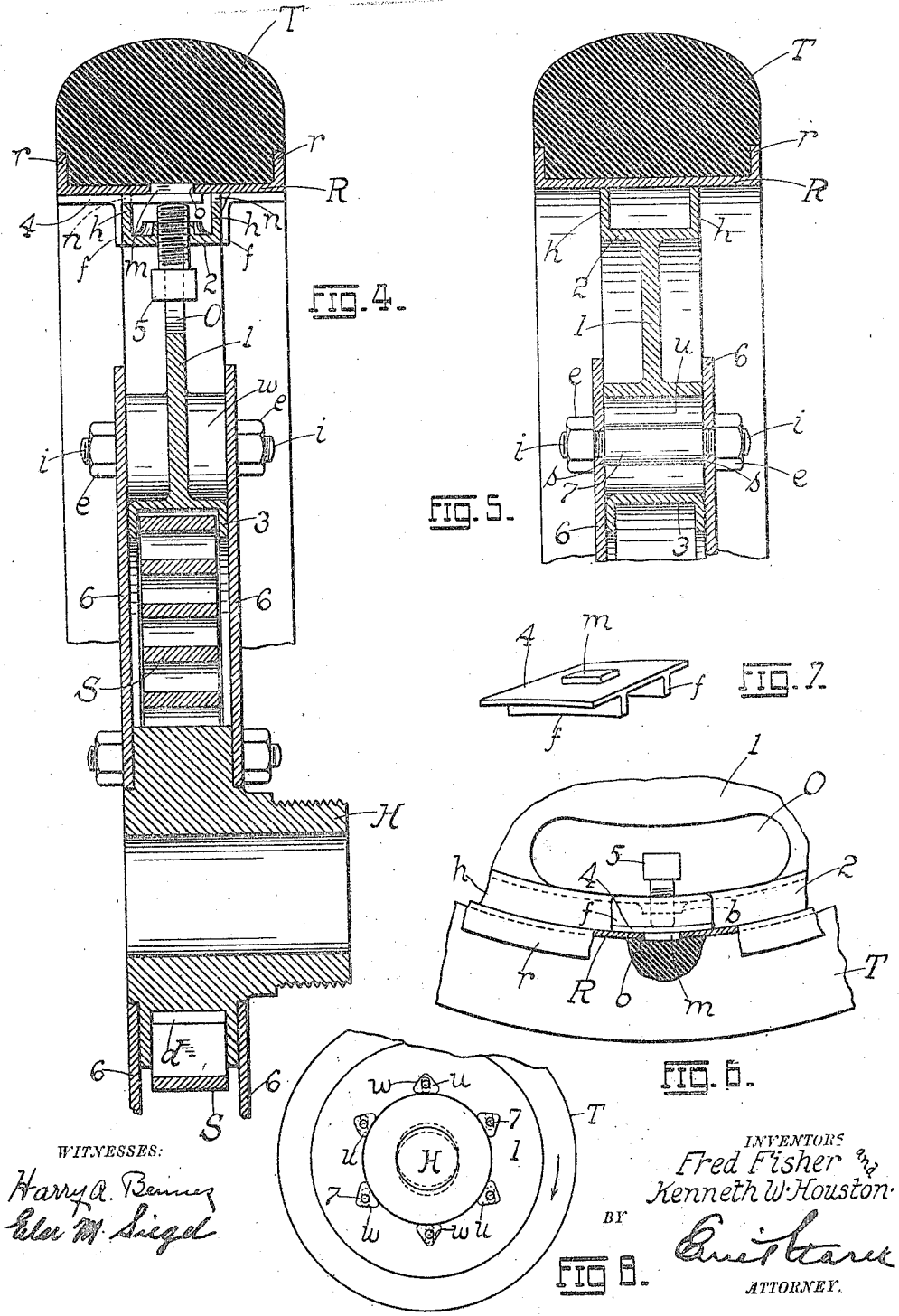

FRED FISHER AND KENNETH W. HOUSTON, OF IRONTON, MISSOURI; SAID FISHER ASSIGNOR TO SAID HOUSTON.

VEHICLE-WHEEL.

1,196,346. Specification of Letters Patent. Patented Aug. 29, 1916.

Application filed January 31, 1916. Serial No. 75,429.

*To all whom it may concern:*

Be it known that we, FRED FISHER and KENNETH W. HOUSTON, citizens of the United States, residing at Ironton, in the county of Iron and State of Missouri, have invented certain new and useful Improvements in Vehicle-Wheels, of which the following is a full, clear, and exact description, reference being had to the accompanying drawings, forming a part hereof.

Our invention has relation to improvements in vehicle wheels; and it consists in the novel features of construction more fully set forth in the specification and pointed out in the claims.

The object of our invention is to provide a vehicle wheel in which the pneumatic tire is dispensed with, thus doing away with tire troubles, without sacrificing any of the resiliency of the wheel.

A further object is to provide a vehicle wheel in which the resiliency is interposed between the hub and the fixed rim, at the same time maintaining a positive connection between the hub and the outer part of wheel thereby avoiding slippage between these respective parts.

Further and other advantages will be better apparent from a detailed description of the invention in connection with the accompanying drawings, in which—

Figure 1 represents a face view of the wheel; Fig. 2 is an edge view of Fig. 1; Fig. 3 is an enlarged view similar to Fig. 1, the hub-disk being removed, however, and part of the wheel broken away; Fig. 4 is a vertical cross-section through the wheel taken on the line 4—4 of Fig. 1; Fig. 5 is a similar section taken on the line 5—5 of Fig. 1; Fig. 6 is an enlarged view of a part of the wheel showing the locking plate which secures the tire and rim to the fixed rim; Fig. 7 is a perspective view of the locking plate; and Fig. 8 is a diagrammatic view of the wheel showing how the hub can yield with respect to the outer part of the wheel.

Referring to the drawings, 1 represents an annular web or plate constituting the body portion of the wheel, the same being provided at its outer edge with a channel 2 having side flanges $h, h,$ and at its inner edge with a channel 3. The outer channel 2 serves as the fixed rim of the wheel and will be hereinafter referred to as such. At regular intervals the flanges $h, h,$ of the fixed rim are provided with marginal recesses $n, n,$ into which is placed a locking plate 4 provided with flanges $f, f,$ on its inner face, which pass over and embrace the fixed rim 2, whereby the locking plate is held against lateral displacement. Projecting from the outer face of the locking plate 4 is a lug $m$, directly opposite which is a tightening screw 5 passing through the web of the fixed rim 2, and a reinforcing boss $b$, formed thereon and bearing against the inner face of the locking-plate 4. Adapted to pass over the fixed rim 2 is a demountable rim R provided with openings $o$ equal in number to the locking-plates 4, and so spaced as to register with the lugs $m$ of said plates. The rim R is split at a point $x$ so that it may be sprung apart and passed over the fixed rim and locking-plates 4 a sufficient distance to allow the lugs $m$ to enter the openings $o$, the demountable rim again coming together after said lugs $m$ have entered said openings. The web 1 has large openings O contiguous to the fixed rim 2 and opposite the bosses $b$ in order that access may be had to the tightening-screw 5 for adjustment. The rim R is provided with annular flanges $r, r,$ for more effectively securing a rubber tire T which is adapted to pass around the rim R and be securely held thereby.

H represents the hub of the wheel between which and the channel 3 of the web 1 is placed a spiral spring S, the outer end of which is secured into said channel while the inner end fits into a radial depression $d$ on the periphery of the hub. Bolted to each side of the hub H and incasing the spring S are the hub-plates or disks 6, 6; and at regular intervals, a series of spacing members or bolts 7 are passed through the plates 6, 6, near their outer edges, said plates being confined between the shoulders $s, s,$ of the spacing members, and the nuts $e, e,$ which pass over the screw-threaded stems $i, i,$ of said members 7. The members 7 also traverse openings $u$, bounded by flanged walls $w$, in the web 1.

After the tire T has been placed over the rim R, the screws 5 are tightened against the plates 4, thereby driving said plates firmly against the rim R and causing the rim to expand sufficiently to take up the play between the rim and the tire. It is obvious that the rim cannot slip on the fixed rim since it is locked to the plates 4 which in turn are incapable of lateral movement on the fixed rim owing to the flanges $f$, $f$, straddling the fixed rim, and the recesses $n$, $n$, in which the plates 4 rest.

Owing to the movement of the hub H relative to the web 1, it is necessary to provide a clearance between the members 7, and the walls $w$ of the opening $u$, and we have chosen to adopt a triangular opening (as shown in the diagrammatic view Fig. 8) as it gives sufficient clearance without unnecessary play. When the wheel is in motion the walls $w$ of the openings $u$ will engage the bolts 7 and carry them around with the outer part of the wheel; the bolts 7, being fixed to the hub-plates 6, will obviously cause them and the hub to rotate with the outer part of the wheel, at the same time allowing a relative transverse movement between the outer and inner parts of the wheel because of the openings $u$. The shocks and jolts that the wheel suffers will be communicated to the spring S where they are allowed to spend their force, because of the play or relative movement just described, the hub remaining unaffected. It is thus clear that no jolts would be communicated to the axle and vehicle, all being dissipated by virtue of the resiliency of the wheel.

It is obvious that we may resort to modifications of the details of the construction without departing from the spirit of the invention.

Having described our invention what we claim is:

1. In a vehicle wheel, a fixed rim, a demountable rim surrounding the fixed rim, the demountable rim being provided with openings, locking plates interposed between said demountable rim and fixed rim, the latter being provided with peripheral recesses for receiving the locking-plates, suitable formations on the outer faces of the locking-plates entering the openings of the demountable rim, flanges projecting from the inner faces of the locking plates, and straddling the fixed rim, and screws operating through the fixed rim and engaging the inner faces of the locking plates.

2. In a vehicle wheel, a fixed channel rim opening outwardly, the flanges of the channel being provided with opposite marginal recesses, a series of plates received by said recesses and projecting beyond the flanges of the fixed rim, flanges on the plates engaging the outer faces of the flanges of the channel, a rim encompassing the several plates and provided with openings opposite the plates, suitable formations on the outer faces of the plates entering said openings, and screws traversing the webs of the channel and engaging the inner faces of the plates for locking the parts together.

3. In a vehicle wheel, a fixed channel rim opening outwardly, the flanges of the channel being provided with marginal recesses, a series of plates spanning the channel and resting in the recesses aforesaid, formations on the inner faces of the plates engaging the flanges of the channel, an outer rim engaged by the plates and provided with sockets opposite the plates, the latter having suitable lugs entering said sockets, and screws carried by the webs of the channel and engaging the plates.

In testimony whereof we affix our signatures, in presence of two witnesses.

FRED FISHER.
KENNETH W. HOUSTON.

Witnesses:
EMIL STAREK,
J. H. KEITH.